(12) United States Patent
Hiraoka et al.

(10) Patent No.: US 6,312,769 B1
(45) Date of Patent: Nov. 6, 2001

(54) LIQUID CRYSTAL ALIGNMENT LAYER, PRODUCTION METHOD FOR THE SAME, AND LIQUID CRYSTAL DISPLAY DEVICE COMPRISING THE SAME

(75) Inventors: Hiroyuki Hiraoka, Kyoto; Yasumasa Takeuchi, Aoba-ku; Shin-ichi Kimura; Yasuo Matsuki, both of Mie, all of (JP); Toshihiro Ogawa, Birmingham, AL (US); Masayuki Kimura, Mie (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/069,169

(22) Filed: Apr. 29, 1998

(30) Foreign Application Priority Data

Apr. 30, 1997 (JP) .................................................. 9-112701

(51) Int. Cl.$^7$ ........................... C09K 19/00; C09K 19/56; G02F 1/133
(52) U.S. Cl. ........................ 428/1.1; 252/299.4; 349/191
(58) Field of Search ........................ 252/299.4; 349/191; 428/1.1

(56) References Cited

U.S. PATENT DOCUMENTS

| | | | |
|---|---|---|---|
| 4,702,558 | * 10/1987 | Coles et al. | 349/123 X |
| 4,892,926 | * 1/1990 | Suenaga et al. | 528/305 |
| 4,983,318 | * 1/1991 | Matsumoto et al. | 252/299.01 |
| 5,073,294 | * 12/1991 | Shannon et al. | 252/299.01 |

(List continued on next page.)

FOREIGN PATENT DOCUMENTS 2-196219  8/1990  (JP) .
5-232472  9/1993  (JP) .
6-130390  5/1994  (JP) .

OTHER PUBLICATIONS

Kenichiro Ohsawa, et al., pp. 1–5, "Fine Striae Forming on Synthesis Silica Glass by ARF Excimer Laser Beam Irradiation".

H. Hiraoka, et al., SPIE, vol. 3093, pp. 204–212, "Interactions of Pulsed UV–Laser With Polymer Surfaces: Periodic Structures, Functional Group Alignment and Diamond Deposition".

H. Himmelbauer, et al., Applied Physics A, vol. 63, pp. 336–339, "UV–Laser–Induced Surface Topology Changes in Polyimide", Jun. 1996.

Abstract of JP 05–0535143 (Mar. 1993).

Chigrinov, V. G., et al. "Physics and applications of LC photo–alignment: recent results," *Proceedings of the SPIE*, vol. 3318, pp. 454–464, (Mar. 1997).

Iimura Y., et al., "Alignment Control of a Liquid Crystal on a Photosensitive Polyvinlalcohol Film", *Jpn. J. Appl. Phys.*, part 2, vol. 32, No. 1A/B, pp. L93–L96, (Jan. 1993).

Lien A., et al., "UV modification of surface pretilt of alignment layers for multidomain liquid crystal displays," vol. 67, No. 21, pp. 3108–3109, (Nov. 1995).

Luo, Q., et al., "Alignment of liquid crystal on the polymide films irradiated by pulsed ultravoilet laser," 9$^{th}$ *Int'l Symposium on on Electrets (ISE 9) Proceedings*, pp. 662–667, (Sep., 1996).

(List continued on next page.)

*Primary Examiner*—C. H. Kelly
(74) *Attorney, Agent, or Firm*—Oblon, Spivak, McClelland, Maier & Neustadt, P.C.

(57) ABSTRACT

A method of producing a liquid crystal alignment layer comprising exposing an organic film to polarized pulse laser beam to align molecules in a surface portion of the organic film. There is provided a liquid crystal alignment layer composed of a polyamide film having aligned molecules in a surface portion.

13 Claims, 1 Drawing Sheet

U.S. PATENT DOCUMENTS 5,477,360 * 12/1995 Sunohara et al. .................. 359/78

5,596,435 * 1/1997 Sunohara et al. ................ 349/132

5,807,498 * 9/1998 Gibbons et al. ............... 252/299.4

5,846,552 * 12/1998 Gibbons et al. ............... 252/299.4

5,858,273 * 1/1999 Asaoka et al. ................. 252/299.4

OTHER PUBLICATIONS

Newsrome, C. J., et al., "Photoinduced Alignment of Liquid Crystals Using Polymide Irradiated with a Polarised Excimer Laser," $17^{th}$ *Int'l Liquid Crystal Conference*, vol. 329, pp. 1173–1180, (1998).

* cited by examiner

LIQUID CRYSTAL ALIGNMENT LAYER, PRODUCTION METHOD FOR THE SAME, AND LIQUID CRYSTAL DISPLAY DEVICE COMPRISING THE SAME

DETAILED DESCRIPTION OF THE INVENTION

The present invention relates to a liquid crystal alignment layer, a production method for the same and a liquid crystal display device comprising the same. More specifically, it relates to a method of producing a liquid crystal alignment layer by aligning molecules in a surface portion of the layer through exposure to polarized pulsed laser beam, a liquid crystal alignment layer produced by the method and a liquid crystal display device comprising the same.

Currently, there is known an TN (Twisted Nematic) liquid crystal display device having so-called TN liquid crystal cells, which is produced by forming a liquid crystal alignment layer on the surface, having a transparent conductive film, of a substrate to prepare a substrate for a liquid crystal display device, arranging two of the substrate to face each other, forming a nematic liquid crystal layer having dielectric anisotropy between the two substrates to form a sandwich-structured cell and twisting the long axis of the liquid crystal molecules at 90° from one substrate toward the other substrate continuously.

The alignment of the liquid crystal molecules of a liquid crystal display device such as this TN liquid crystal display device is generally effected by a liquid crystal alignment layer provided with an ability to align liquid crystal molecules, by rubbing.

However, this rubbing involves the following problems:

(1) Since static electricity may cause the destruction of a TFT device, its production machine takes generally countermeasures against static electricity. However, the countermeasures are not perfect against static electricity generated by rubbing.

(2) Since rubbing produces dust, cleaning is required as a subsequent step, thereby increasing the number of steps.

(3) Since a stepped portion and a flat portion of an alignment layer having the stepped portion differ from each other in rubbing conditions, alignment anchoring force and tilt angle are liable to be uneven.

(4) Since rubbing is carried out in a single direction, the production process of an alignment layer comprising divided alignment pixels becomes complicated.

(5) To uniformly rub an alignment layer for a large-sized substrate, for example, measuring 550×650 mm or more, a special equipment is required.

To avoid the above problems, methods for providing a liquid crystal alignment layer with an ability to align liquid crystal molecules, without necessity of rubbing treatment (to be referred to as "non-rubbing treatment" hereafter) have also been developed. One of the methods is to expose a liquid crystal alignment layer to laser beam.

JP-A 2-196219 (the term "JP-A" as used herein means an "unexamined published Japanese patent application") discloses a method of producing a liquid crystal alignment layer by exposing the surface of a polymer film on an electrode substrate in a liquid crystal display device to high-intensity beam from an ultraviolet laser such as an XeF, XeCl, KrF, ArF or F2 excimer laser to form a periodic surface structure.

JP-A 6-130390 discloses a method of irradiating an alignment layer, which aligns the liquid crystal molecules formed on the substrate in a predetermined direction, with beam from an excimer laser through a mask having a large number of slit holes parallel to one another, while the inside of the container is deaerated, in a vacuum container.

JP-A 5-232472 discloses a method of producing an electro-optic device comprising an alignment layer is formed on the surfaces, which are arranged to face each other, of a pair of transparent substrates with liquid crystals are filled into the space between the pair of transparent substrates, the method comprising the steps of forming the alignment layer having spacers for supporting a liquid crystal film on the opposing surfaces of the transparent substrates and exposing the alignment layer to laser beam to align the liquid crystal molecules.

In either one of the above methods, since polymer molecules in a surface portion of the alignment layer are cut in a certain cycle and the cut atoms or molecules are oxidized to gasify when the liquid crystal alignment layer is exposed to laser beam, a periodic surface structure is produced on the surface of the alignment layer. Therefore, these methods have defects in that the environment of a clean room is polluted by gasified decomposed products and that since a periodic surface structure is produced on the surface by the decomposition of the polymer molecules, the electric characteristics of the surface are not satisfactory.

It is therefore an object of the present invention to provide a novel method for aligning molecules in a surface portion of an alignment layer by a non-rubbing treatment.

It is another object of the present invention to provide a method capable of aligning molecules in a surface portion of an alignment layer effectively without generating dust or decomposed products.

It is still another object of the present invention to provide a method capable of forming a periodic surface structure, which provide an ability to align liquid crystal molecules, on the surface of an alignment layer non-destructively without decomposing the molecules in a surface portion of the alignment layer.

It is still another object of the present invention to provide a liquid crystal alignment layer composed of a polyimide film and having irregularities or swells formed on the surface non-destructively and periodically.

It is still another object of the present invention to provide a liquid crystal display device comprising the above liquid crystal alignment layer of the present invention.

Other objects and advantages of the present invention will become apparent from the following description.

According to the present invention, firstly, the above objects and advantages of the present invention can be attained by a method of producing a liquid crystal film comprising exposing an organic film to polarized pulsed laser beam having a pulse energy (about 1 mJ/cm$^2$ to 3 mJ/cm$^2$) much lower than the lowest critical pulse energy (about 10 mJ/cm$^2$) by which the decomposition by exposure of polymer molecules occurs, to align polymer molecules in a surface portion of the organic film.

According to the present invention, secondly, there is provided a liquid crystal alignment layer which is composed of a polyimide film and has molecules aligned through exposure to polarized pulsed laser beam, in a surface portion thereof.

According to the present invention, thirdly, there is provided a liquid crystal display device comprising the above liquid crystal alignment layer of the present invention.

FIG. 1 of the annexed drawing shows the relationship between the transmittance (%) of a liquid crystal display device and voltage (volt). A curve A is drawn for a liquid crystal display device comprising a liquid crystal alignment layer exposed to laser beam and a curve B is drawn for a liquid crystal display device comprising a rubbed liquid crystal alignment layer.

A description is first given of the method of the present invention.

In the method of the present invention, the organic film for forming a liquid crystal alignment layer is formed from an organic polymer. Illustrative examples of the organic polymer include polyimides, polysulfones, polyesters, polyamides, poly(meth)acrylates, polycarbonates, polyphenylene sulfides, polyphenylene oxides, norbornene resins and the like.

Any known organic polymers can be used. Of these, organic polymers having a secondary transition point (Tg) or melting point (Tm) of at least about 90° C. and an SP (solubility parameter) value of at least 8.5 are preferred.

Tg is more preferably at least 150° C., particularly preferably at least 180° C.

These organic polymers which do not swell with an ordinary solvent such as an alcohol or ketone are used advantageously.

A polyimide, one of the organic polymers, contains recurring units represented by the following formula (I):

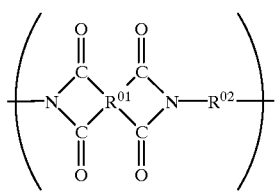

(I)

wherein $R^{01}$ is a tetravalent organic group and $R^{02}$ is a divalent organic group.

$R^{01}$ is a tetravalent organic group obtained by removing four carboxyl groups from a tetracarboxylic acid and $R^{02}$ a divalent organic group obtained by removing two amino groups from a diamine compound.

The above polyimide can be obtained by reacting a tetracarboxylic dianhydride and a diamine compound in an organic solvent to synthesize a polyamic acid and dehydrating and ring-closing the polyamic acid as required.

[Tetracarboxylic dianhydride]

Illustrative examples of the tetracarboxylic dianhydride include 1,2,3,4-butane tetracarboxylic dianhydride, 1,2,3,4-cyclobutane tetracarboxylic dianhydride, 1,2-dimethyl-1,2,3,4-cyclobutane tetracarboxylic dianhydride, 1,3-dimethyl-1,2,3,4-cyclobutane tetracarboxylic dianhydride, 1,3-dichloro-1,2,3,4-cyclobutane tetracarboxylic dianhydride, 1,2,3,4-tetramethyl-1,2,3,4-cyclobutane tetracarboxylic dianhydride, 1,2,3,4-cyclopentane tetracarboxylic dianhydride, 1,2,4,5-cyclohexane tetracarboxylic dianhydride, 3,3',4,4'-dicyclohexyl tetracarboxylic dianhydride, 2,3,5-tricarboxycyclopentyl acetic dianhydride, 3,5,6-tricarboxynorbornane-2-acetic dianhydride, 2,3,4,5-tetrahydrofuran tetracarboxylic dianhydride, 1,3,3a,4,5,9b-hexahydro-5(tetrahydro-2,5-dioxo- 3-furanyl)-naphtho[1,2-c]-furan-1,3-dione, 1,3,3a,4, 5,9b-hexahydro-5-methyl-5(tetrahydro-2,5-dioxo-3-furanyl)-naphtho[1,2-c]-furan-1,3-dione, 1,3,3a,4,5,9b-hexahydro-5-ethyl-5(tetrahydro-2,5-dioxo-3-furanyl)-naphtho[1,2-c]-furan-1,3-dione, 1,3,3a,4,5,9b-*hexahydro*-7-methyl-5(tetrahydro-2,5-dioxo-3-furanyl)-naphtho[1,2-c]-furan-1,3-dione, 1,3,3a,4,5,9b-hexahydro-7-ethyl-5(tetrahydro-2,5-dioxo-3-furanyl)-naphtho[1,2-c]-furan-1,3-dione, 1,3,3a,4,5,9b-hexahydro-8-methyl-5(tetrahydro-2,5-dioxo-3-furanyl)-naphtho[1,2-c]-furan-1,3-dione, 1,3,3a,4, 5,9b-hexahydro-8-ethyl-5(tetrahydro-2,5-dioxo-3-furanyl)-naphtho[1,2-c]-furan-1,3-dione, 1,3,3a,4,5,9b-hexahydro-5, 8-dimethyl-5(tetrahydro-2,5-dioxo-3-furanyl)-naphtho[1,2-c]-furan-1,3-dione, 5-(2,5-dioxotetrahydrofural)-3-methyl-3-cyclohexene-1,2-dicarboxylic dianhydride, bicyclo[2,2,2]-octo-7-ene-2,3,5,6-tetracarboxylic dianhydride, aliphatic and alicyclic tetracarboxylic dianhydrides such as compounds represented by the following formulas (II) and (III):

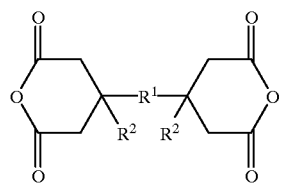

(II)

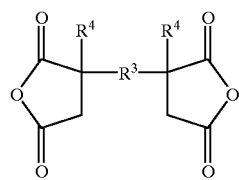

(III)

wherein $R^1$ and $R^3$ are a divalent organic group having an aromatic ring, and each of $R^2$'s and $R^4$'s may be the same or different and is a hydrogen atom or an alkyl group, pyromellitic dianhydride, 3,3',4,4'-benzophenone tetracarboxylic dianhydride, 3,3',4,4'-biphenylsulfone tetracarboxylic dianhydride, 1,4,5,8-naphthalene tetracarboxylic dianhydride, 2,3,6,7-naphthalene tetracarboxylic dianhydride, 3,3',4,4'-biphenylether tetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy) diphenylpropane dianhydride, 3,3',4,4'-biphenyltetracarboxylic dianhydride, bis(phthalic acid) phenylphosphine oxide dianhydride, p-phenylene-bis (triphenylphthalic acid)dianhydride, m-phenylene-bis (triphenylphthalic acid)dianhydride, bis(triphenylphthalic acid)-4,4'-diphenylether dianhydride, bis(triphenylphthalic acid)-4,4'-diphenylmethane dianhydride, ethylene glycol-bis (anhydrotrimellitate), propylene glycol-bis (anhydrotrimellitate), 1,4-butanediol-bis (anhydrotrimellitate), 1,6-hexanediol-bis (anhydrotrimellitate), 1,8-octanediol-bis (anhydrotrimellitate), 2,2-bis(4-hydroxyphenyl)propane-bis (anhydrotrimellitate) and aromatic tetracarboxylic dianhydrides such as compounds represented by the following formulas (1) to (4). They may be used alone or in combination of two or more.

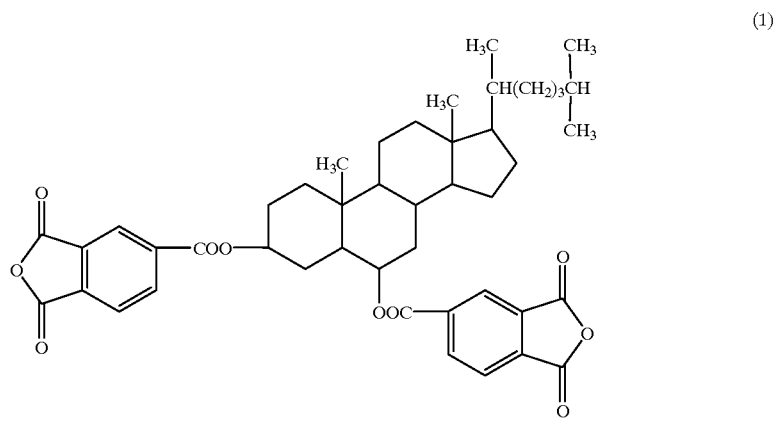
(1)
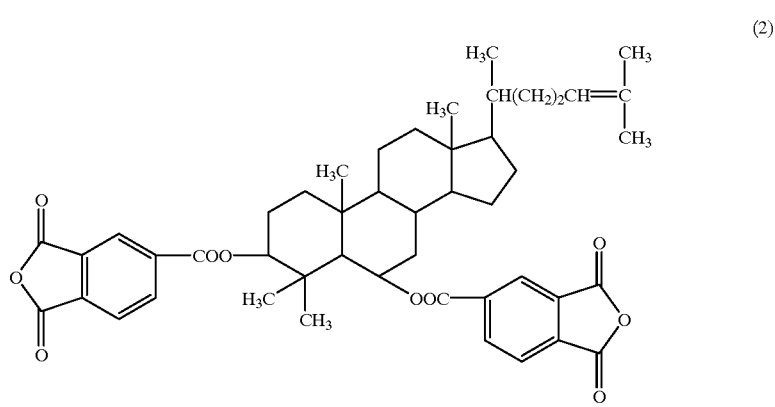
(2)
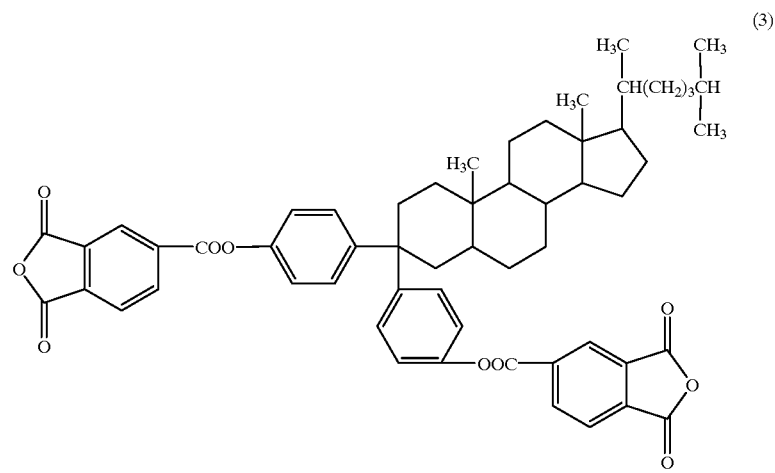
(3)

(4)

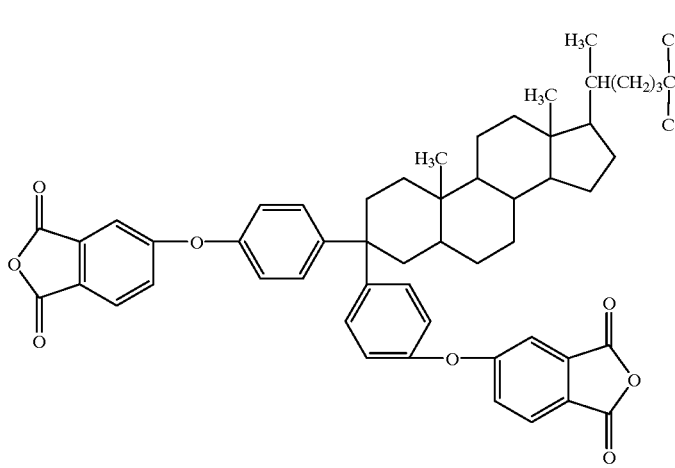

Of these, 1,2,3,4-butane tetracarboxylic dianhydride, 1,2,3,4-cyclobutane tetracarboxylic dianhydride, 1,3-dimethyl-1,2,3,4-cyclobutane tetracarboxylic dianhydride, 1,2,3,4-cyclopentane tetracarboxylic dianhydride, 2,3,5-tricarboxycyclopentyl acetic dianhydride, 5-(2,5-dioxotetrahydrofural)-3-methyl-3-cyclohexene-1,2-dicarboxylic dianhydride, 1,3,3a,4,5,9b-hexahydro-5-(tetrahydro-2,5-dioxo-3-furanyl)-naphtho[1,2-c]furan-1,3-dione, 1,3,3a,4,5,9b-hexahydro-8-methyl-5-(tetrahydro-2,5-dioxo-3-furanyl)-naphtho[1,2-c]furan-1,3-dione, 1,3,3a,4,5,9b-hexahydro-5,8-dimethyl-5-(tetrahydro-2,5-dioxo-3-furanyl)-naphtho[1,2-c]furan-1,3-dione, bicyclo[2,2,2]-octo-7-ene-2,3,5,6-tetracarboxylic dianhydride, pyromellitic dianhydride, 3,3',4,4'-benzophenone tetracarboxylic dianhydride, 3,3',4,4'-biphenylsulfone tetracarboxylic dianhydride, 1,4,5,8-naphthalene tetracarboxylic dianhydride, compounds represented by the following formulas (5) to (7) out of the compounds represented by the above formula (II), and a compound represented by the following formula (8) out of the compounds represented by the above formula (III) are preferred because they can exhibit excellent liquid crystal aligning properties. Particularly preferred are 1,2,3,4-cyclobutane tetracarboxylic dianhydride, 1,3-dimethyl-1,2,3,4-cyclobutane tetracarboxylic dianhydride, 2,3,5-tricarboxycyclopentyl acetic dianhydride, 1,3,3a,4,5,9b-hexahydro-5-(tetrahydro-2,5-dioxo-3-furanyl)-naphtho[1,2-c]furan-1,3-dione, 1,3,3a,4,5,9b-hexahydro-8-methyl-5-(tetrahydro-2,5-dioxo-3-furanyl)-naphthol[1,2-c]furan-1,3-dione, pyromellitic dianhydride and a compound represented by the following formula (5):

(5)

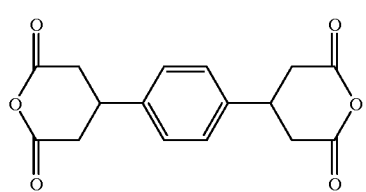

(6)

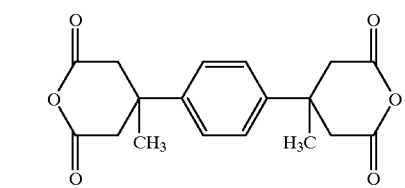

(7)

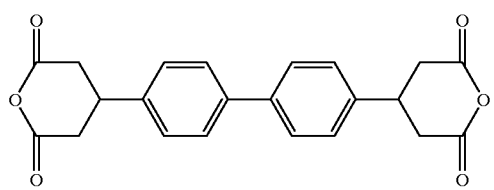

(8)

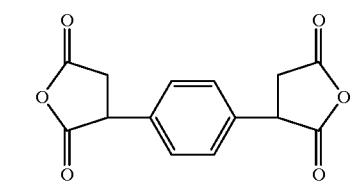

[diamine compound]

Illustrative examples of the diamine compound used in the synthesis of the above polyamic acid include aromatic diamines such as p-phenylenediamine, m-phenylenediamine, 4,4'-diaminodiphenylmethane, 4,4'-diaminodiphenylethane, 4,4'-diaminodiphenyl sulfide, 4,4'-diaminodiphenyl sulfone, 3,3'-dimethyl-4,4'-diaminobiphenyl, 4,4'-diaminobenzanilide, 4,4'-diaminodiphenyl ether, 1,5-diaminonaphthalene, 3,3'-dimethyl-4,4'-diaminobiphenyl, 5-amino-1-(4'-aminophenyl)-1,3,3-trimethylindane, 6-amino-1-(4'-aminophenyl)-1,3,3-trimethylindane, 3,4'-diaminodiphenyl ether, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 2,7-diaminofluorene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy- 4,4'-diaminobiphenyl, 1,4,4,'-(p-phenyleneisopropylidene)bisaniline and 4,4'-(m-phenyleneisopropylidene)bisaniline; aliphatic and alicyclic diamines such as 1,1-metaxylylenediamine, 1,3-propanediamine, tetramethylenediamine, pentamethylenediamine, hexamethylenediamine, heptamethylenediamine, octamethylenediamine, nonamethylenediamine, 4,4-diaminoheptamethylene diamine, 1,4-diaminocyclohexane, isophoronediamine, tetrahydrodicyclopentadienylene diamine, hexahydro-4,7-methanoindanylene(OK?) dimethylenediamine, tricyclo[6.2.1.0$^{2,7}$]-undecylenedimethyldiamine and 4,4'-methylenebis(cyclohexylamine); diamines having two primary amino groups and a nitrogen atom other than the primary amino group in the molecule such as 2,3-diaminopyridine, 2,6-diaminopyridine, 3,4-diaminopyridine, 2,4-diaminopyrimidine, 5,6-diamino-2,3-dicyanopyrazine, 5,6-diamino-2,4-dihydroxypyrimidine, 2,4-diamino-6-dimethylamino-1,3,5-triazine, 1,4-bis(3-aminopropyl)piperazine, 2,4-diamino-6-isopropoxy-1,3,5-triazine, 2,4-diamino-6-methoxy-1,3,5-triazine, 2,4-diamino-6-phenyl-1,3,5-triazine, 2,4-diamino-6-methyl-s-triazine, 2,4-diamino-1,3,5-triazine, 4,6-diamino-2-vinyl-s-triazine, 2,4-diamino-5-phenylthiazole, 2,6-diaminopurine, 5,6-diamino-1,3-dimethyluracil, 3,5-diamino-1,2,4-triazole, 6,9-diamino-2-ethoxyacridine lactate, 3,8-diamino-6-phenylphenanthridine, 1,4-diaminopiperazine, 3,6-diaminoacridine, bis(4-aminophenyl)phenylamine and compounds represented by the following formulas (IV) and (V):

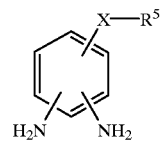

(IV)

wherein R$^5$ is a monovalent organic group having a ring structure containing a nitrogen atom selected from the group consisting of pyridine, pyrimidine, triazine, piperidine and piperazine, and X is a divalent organic group,

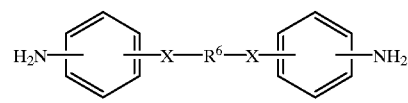

(V)

wherein R$^6$ is a divalent organic group having a ring structure containing a nitrogen atom selected from the group consisting of pyridine, pyrimidine, triazine, piperidine and piperazine, and X's are a divalent organic group and may be the same or different;

monosubstituted phenylene diamines represented by the following formula (VI):

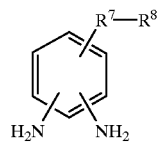

(VI)

wherein R$^7$ is a divalent organic group selected from —O—, —COO—, —OCO—, —NHCO—, —CONH— and —CO—, and R$^8$ is a monovalent organic group having a steroid skeleton or an alkyl group having 6 to 30 carbon atoms;

diaminoorganosiloxanes represented by the following formula (VII):

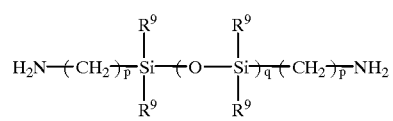

(VII)

wherein R$^9$'s are a hydrocarbon group having 1 to 12 carbon atoms and may be the same or different, p is an integer of 1 to 3, and q is an integer of 1 to 20;

and compounds represented by the following formulas (9) to (13):

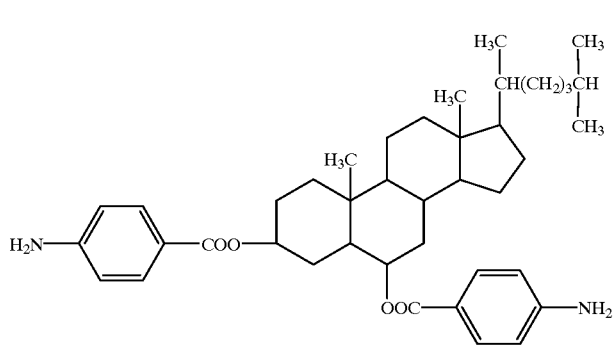
(9)

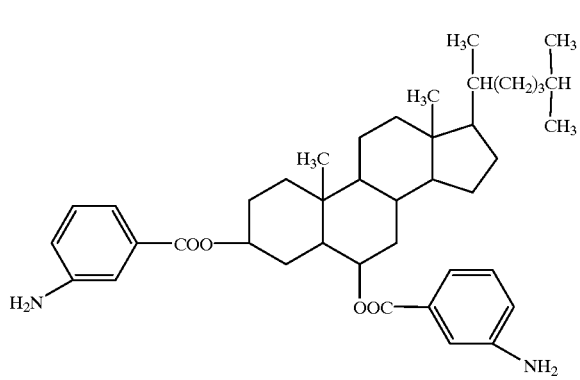
(10)

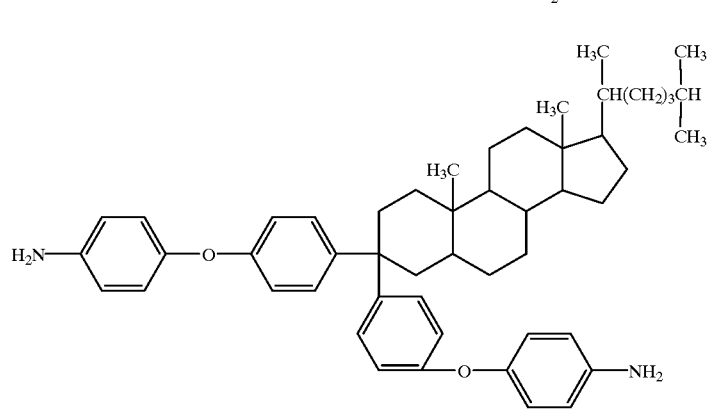
(11)

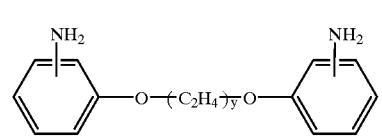
(12)

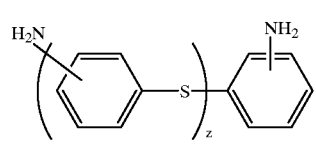
(13)

wherein y is an integer of 2 to 12 and z is an integer of 1 to 5.

These diamine compounds may be used alone or in combination of two or more.

Of these, p-phenylenediamine, 4,4'-diaminodiphenylmethane, 4,4'-diaminodiphenyl sulfide, 1,5-diaminonaphthalene, 2,7-diaminofluorene, 4,4'-diaminodiphenyl ether, 2,2-bis[4-(4-aminophenoxy)phenyl]propane, 9,9-bis(4-aminophenyl)fluorene, 4,4'-(p-phenylenediisopropylidene)bisaniline, 4,4'-(m-phenylenediisopropylidene)bisaniline, 1,4-cyclohexanediamine, 4,4'-methylenebis(cyclohexylamine), 1,4-bis(4-aminophenoxy)benzene, 4,4'-bis(4-aminophenoxy)biphenyl, compounds represented by the above formulas (9) to (13), 2,6-diaminopyridine, 3,4-diaminopyridine, 2,4-diaminopyrimidine, 3,6-diaminoacridine, a compound represented by the following formula (14) out of the compounds represented by the above formula (IV), a compound represented by the following formula (15) out of the compounds represented by the above formula (V) and compounds represented by the following formulas (16) to (19) out of the compounds represented by the above formula (VI) are preferred.
(14)
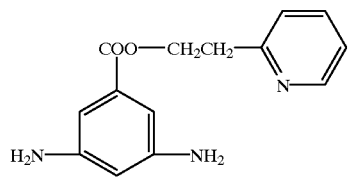
(15)
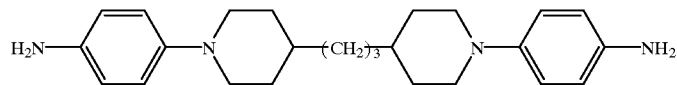
(16)
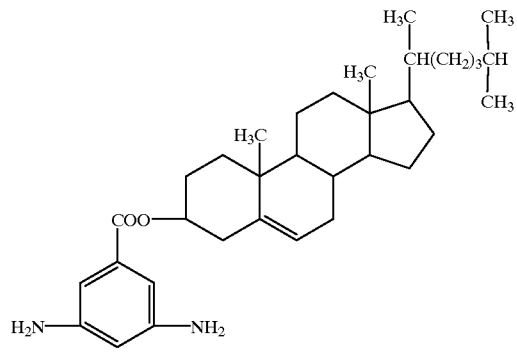
(17)
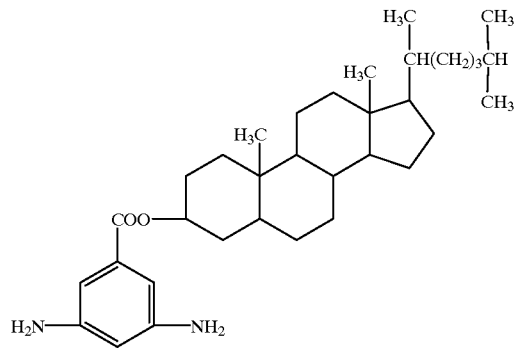
(18)
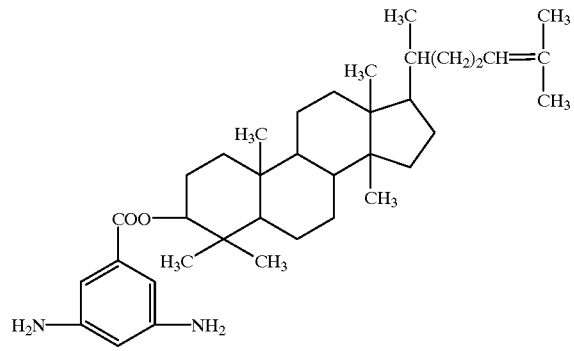

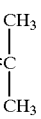

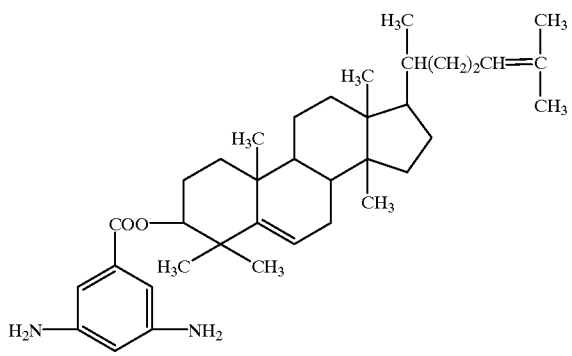

[polyamic acid]

As for the ratio of a tetracarboxylic dianhydride and a diamine compound used in the synthesis reaction of a polyamic acid, the acid anhydride group of the tetracarboxylic dianhydride is preferably 0.2 to 2 equivalents, more preferably 0.3 to 1.2 equivalent, per 1 equivalent of the amino group contained in the diamine compound.

The synthesis reaction of a polyamic acid is generally carried out in an organic solvent at 0° to 150° C., preferably 0° to 100° C. for 1 to 48 hours. The organic solvent is not limited to a particular kind as long as it can dissolve a reaction product produced by the reaction. Illustrative examples of the organic solvent include aprotic polar solvents such as N-methyl-2-pyrrolidone, N,N-dimethylacetoamide, N,N-dimethylformamide, dimethylsulfoxide, Y-butyrolactone, tetramethyl urea and hexamethylphosphor triamide; and phenolic solvents such as m-cresol, xylenol, phenol and phenol halide. In general, the amount of the organic solvent used is preferably such that the total amount of the tetracarboxylic dianhydride and the diamine compound is 0.1 to 30 wt % of the total amount of the reaction solution.

The organic solvent may be used in combination with a poor solvent for a polyamic acid such as an alcohol, ketone, ester, ether, halogenated hydrocarbon or hydrocarbon in such an amount that the produced polyamic acid does not precipitate. Illustrative examples of the poor solvent include methyl alcohol, ethyl alcohol, isopropyl alcohol, cyclohexanol, ethylene glycol, propylene glycol, 1,4-butanediol, triethylene glycol, acetone, methyl ethyl ketone, cyclohexanone, methyl acetate, ethyl acetate, butyl acetate, diethyl oxalate, diethyl malonate, diethyl ether, ethylene glycol methyl ether, ethylene glycol ethyl ether, ethylene glycol monophenyl ether, ethylene glycol methylphenyl ether, ethylene glycol ethylphenyl ether, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, ethylene glycol methyl ether acetate, ethylene glycol ethyl ether acetate, 4-hydroxy-4-methyl-2-pentanone, 2,4-pentanedione, 2,5-hexanedione, ethyl 2-hydroxypropionate, ethyl 2-hydroxy-2-methyl propionate, ethyl 2-hydroxy-2-methyl propionate, ethyl ethoxyacetate, ethyl hydroxyacetate, methyl 2-hydroxy-3-methyl butanoate, methyl 3-methoxypropionate, ethyl 3-methoxypropionate, ethyl 3-ethoxypropionate, methyl 3-ethoxypropionate, methyl pyruvate, ethyl pyruvate, hydroxymethyl pyruvate, acetomethyl acetate, acetoethyl acetate, methylmethoxybutanol, ethylmethoxybutanol, methylethoxybutanol, ethylethoxybutanol, tetrahydrofuran, tetrahydrofurfuryl alcohol, tetrahydro-3-furanmethanol, 1,3-dioxolane, 1,3-dioxepane, 4-methyl-1,3-dioxolane, dichloromethane, 1,2-dichloroethane, 1,4-dichlorobutane, trichloroethane, chlorobenzene, o-dichlorobenzene, hexane, heptane, octane, benzene, toluene, xylene and the like. They may be used alone or in combination of two or more.

A reaction solution containing a polyamic acid dissolved therein can be obtained by the above synthesis reaction. This reaction solution is poured into a large amount of a poor solvent to obtain a precipitate, and the precipitate is then dried at a reduced pressure to obtain a polyamic acid. The step of dissolving this polyamic acid in an organic solvent again and precipitating it in a poor solvent is carried out once or several times to purify the polyamic acid.

[polyimide]

The polyimide constituting the liquid crystal aligning agent of the present invention can be prepared by dehydrating and ring-closing the above polyamic acid. The dehydration and ring closure of the polyamic acid are carried out (i) by heating the polyamic acid, or (ii) by dissolving the polyamic acid in an organic solvent and adding a dehydrating agent and a dehydrating/ring closing catalyst to this solution, and heating as required.

In the method (i) for heating the polyamic acid, the reaction temperature is generally 50° to 300° C., preferably 60° to 250° C. When the reaction temperature is lower than 50° C., a dehydration and ring closure reaction may not proceed sufficiently, while when the reaction temperature is higher than 300° C., the molecular weight of the obtained imidized polymer may lower.

In the method (ii) for adding a dehydrating agent and a dehydrating/ring closing catalyst to the solution of the polyamic acid, on the other hand, an acid anhydride such as acetic anhydride, propionic anhydride or trifluoroacetic anhydride can be used as the dehydrating agent. The amount of the dehydrating agent used is preferably 0.01 to 20 moles per 1 mole of the recurring unit of the polyamic acid. A tertiary amine such as pyridine, collidine, lutidine or triethylamine can be used as the dehydrating/ring closing catalyst. However, the present invention is not limited to these. The amount of the dehydrating/ring closing catalyst used is preferably 0.01 to 10 moles per 1 mole of the dehydrating agent. Illustrative examples of the organic solvent used in a dehydration and ring closure reaction are the same as those listed for the organic solvent used in the synthesis of the polyamic acid. The reaction temperature of the dehydration and ring closure reaction is generally 0° to 180° C., preferably 10° to 150° C. The polyimide can be purified by carrying out the same operation as that for purifying the polyamic acid, on the thus obtained reaction solution. measuring the viscosity of a solution having a polymer concentration of 0.5 g/100 ml at 30° C. using N-methyl-2-pyrrolidone as a solvent.

$$\eta \ln = \frac{\ln(\text{downflow time of solution/downflow time of solvent})}{(\text{weight concentration of polymer})} \quad (1)$$

[liquid crystal aligning agent]

In the present invention, the proportion of the polymer in the liquid crystal aligning agent for forming an organic film as a liquid crystal alignment layer is selected in view of viscosity and volatility. It is preferably 0.1 to 20 wt %, more preferably 1 to 10 wt % of the whole liquid crystal aligning agent. That is, the liquid crystal aligning agent comprising a polymer solution is coated on the surface of a substrate by a printing method, spin coating method or the like, and then dried to form an organic film as an alignment layer material. When the proportion of the polymer is less than 0.1 wt %, the thickness of the organic film is too small, whereby a good liquid crystal alignment layer may not be obtained. On the other hand, when the proportion of the polymer is more than 20 wt %, the thickness of the organic film is too large to obtain a good liquid crystal alignment layer and the viscosity of the liquid crystal aligning agent increases, whereby its coating properties may be deteriorated.

The organic solvent for dissolving the polymer is not particularly limited as long as it can dissolve the polymer. Illustrative examples of the organic solvent are the same as those listed for the solvent used in the synthesis reaction and the dehydration and ring closure reaction of the polyamic acid. The above poor solvents which can be used in combination in the synthesis reaction of the polyamic acid can be also suitably

[terminal modified polymer]

The polyimide constituting the liquid crystal aligning agent used in the present invention may be of a terminal modified type having a controlled molecular weight. Using this terminal modified polymer, for example, the coating characteristics of the liquid crystal aligning agent can be improved without impairing the effect of the present invention. This terminal modified polymer can be synthesized by adding an acid monoanhydride, monoamine compound or monoisocyanate compound to a reaction system in the synthesis of the polyamic acid. Illustrative examples of the acid monoanhydride include maleic anhydride, phthalic anhydride, itaconic anhydride, n-decylsuccinic anhydride, n-dodecylsuccinic anhydride, n-tetradecylsuccinic anhydride, n-hexadecylsuccinic anhydride and the like. Illustrative examples of the monoamine compound include aniline, cyclohexylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-eicosylamine and the like. Illustrative examples of the monoisocyanate compound include phenylisocyanate, naphthylisocyanate and the like.

[logarithmic viscosity of polymer]

The logarithmic viscosity ($\eta$ ln) of the polyamic acid as a precursor of the polyimide constituting the liquid crystal aligning agent used in the present invention is preferably 0.05 to 10 dl/g, more preferably 0.05 to 5 dl/g. The value of the logarithmic viscosity ($\eta$ ln) is obtained from the following equation by selected and used in combination of the above organic solvent.

In the present invention, the liquid crystal aligning agent for forming the organic film may contain a functional silane-containing compound or an epoxy group-containing compound to improve the adhesion of the polymer to the surface of the substrate. Illustrative examples of the functional silane-containing compound include 3-aminopropyl trimethoxysilane, 3-aminopropyl trlethoxysilane, 2-aminopropyl trimethoxysilane, 2-aminopropyl triethoxysilane, N-(2-aminoethyl)-3-aminopropyl trimethoxysilane, N-(2-aminoethyl)-3-aminopropylmethyl dimethoxysilane, 3-ureidopropyl trimethoxysilane, 3-ureidopropyl triethoxysilane, N-ethoxycarbonyl-3-aminopropyl trimethoxysilane, N-ethoxycarbonyl-3-aminopropyl triethoxysilane, N-triethoxysilylpropyl triethylene triamine. N-trimethoxysilylpropyl triethylene triamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyl trimethoxysilane, N-benzyl-3-aminopropyl triethoxysilane, N-phenyl-3-aminopropyl trimethoxysilane, N-phenyl-3-aminopropyl triethoxysilane, N-bis(oxyethylene)-3-aminopropyl trimethoxysilane, N-bis(oxyethylene)-3-aminopropyl triethoxysilane and the like. Preferred examples of the epoxy group-containing compound include ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerine diglycidyl ether, 2,2-dibromoneopentyl glycol diglycidyl ether, 1,3,5,6-tetraglycidyl-2,4-hexanediol, N,N,N',N'-tetraglycidyl-m-xylenediamine, 1,3-bis(N,N-diglycidylaminomethyl) cyclohexane, N,N,N',N'-tetraglycidyl-4,4'-diaminodiphenylmethane and the like. These functional silane-containing compounds or epoxy-group containing compounds are blended in an amount of 40 parts or less by weight, preferably 0.1 to 30 parts by weight, based on 100 parts by weight of the polymer.

[liquid crystal alignment layer and liquid crystal display device]

The method of producing the liquid crystal alignment layer of the present invention is advantageously carried out as follows, for example.

(1) A liquid crystal aligning agent containing an organic polymer is coated on a transparent conductive film side of a substrate having the patterned transparent conductive film formed thereon by a roll coating, spinner coating, printing or the like, and the coated surface is heated to form a coating film. As the substrate may be used a transparent substrate made from glass such as float glass or soda glass or a plastic film such as polyethylene terephthalate, polybutylene terephthalate, polyether sulfone, polycarbonate, polyacrylate, norbornene resin or the like. The transparent conductive film formed on one side of the substrate is a NESA film made from $SnO_2$ or ITO film made from $In_2O_3$—$SnO_2$. The patterning of the transparent conductive coating is carried out by a photo-etching method, a method using a mask in advance or the like.

To further improve the adhesion of the coating film to the substrate and the transparent conductive film in the coating of the liquid crystal aligning agent, a functional silane-containing compound or a titanate may be coated in advance on the substrate or the transparent conductive film. The heating temperature is preferably 80° to 250° C., more preferably 120° to 200° C. The thickness of the formed coating film is generally 0.001 to 1 μm, preferably 0.005 to 0.5 μm.

(2) The formed organic film is exposed to polarized pulsed laser beam having a pulse energy much lower than the lowest critical pulse energy by which the decomposition by exposure of the surface of the organic film takes place. Molecules in a surface portion of the organic film are aligned by this exposure to form a liquid crystal alignment layer.

Illustrative examples of the laser include ArF, KrF, XeCl and XeF excimer lasers; solid lasers such as an Nd:YAG laser, Nd:YLF laser, Nd:YNO$_4$ laser, Ti-sapphire laser and OPO (Opto-Parametric Oscillator) laser, which are excited by a diode or flash lamp; and dye lasers. Of these, an excimer laser is used in conjunction with a polarizer such as a quartz filter inclined at Brewster angle.

The wavelength of the-laser beam is 193 nm to 532 nm or may be higher than that. It is preferably 193 nm to 355 nm.

The pulse width of the polarized pulsed laser beam is preferably 5 nsec to 1 msec, for example.

The incident angle of the polarized laser beam to the organic film is preferably 10° to 40°, the irradiation energy is preferably 1 mJ/cm$^2$ to 3 mJ/cm$^2$ per pulse, and the total irradiation amount is preferably 10 mJ/cm$^2$ to 2 J/cm$^2$.

Parallel swells having a pitch interval almost equal to a pitch interval represented by the following equation (VIII) are formed on the surface of the organic film by exposure to polarized pulsed laser beam:

$$P = \frac{\lambda}{n - \sin\theta} \quad \text{(VIII)}$$

wherein λ is a wavelength (nm) of the polarized pulsed laser beam, n is a refractive index of the organic polymer, θ is an incident angle (°) of the polarized pulsed laser beam, and P is a pitch (nm) of photoelastic waves produced on the surface of the organic film.

The pitch interval can be, for example, 90 to 100 nm.

Although the alignment direction of molecules in the surface portion depends on the type of the organic polymer, the molecules of the organic polymer at a depth of 50 to 100 nm from the surface are aligned such that they cross the swells at 90°.

According to the method of the present invention, there is produced a liquid crystal alignment layer having molecules aligned by exposure to polarized pulsed laser beam in its surface portion.

Therefore, according to the present invention, secondly, there is advantageously provided a liquid crystal alignment layer which is composed of a polyimide film having molecules aligned by exposure to polarized pulsed laser beam in its surface portion.

Next, to produce a liquid crystal display device from a substrate, a liquid crystal cell is constructed by preparing two substrates having the above liquid crystal alignment layer formed thereon, arranging the two substrates to face each other with spacing (cell gap) therebetween in such a manner that the irradiation directions of polarized pulsed laser beam onto the liquid crystal alignment layers become at right angles to each other or antiparallel to each other, sticking together the peripheral portions of the two substrates with a sealing agent, filling liquid crystals into the cell gap defined by the surfaces of the substrates and the sealing agent, and sealing up a filling hole. A liquid crystal display device can be obtained by sticking a polarizer to the outer surfaces of the liquid crystal cell, that is, the other sides of the substrates forming the liquid crystal cell in such a manner that the polarizing direction of the polarizer agrees with, or crosses at right angles to, the irradiation direction of polarized pulsed laser beam onto the liquid crystal alignment layer formed on one side of the substrate.

As the above sealing agent may be used an epoxy resin containing a curing agent and aluminum oxide particles as a spacer.

The liquid crystal is a nematic liquid crystal or smectic liquid crystal. Of these, a nematic liquid crystal is preferred, as exemplified by a Schiff's base liquid crystal, azoxy liquid crystal, biphenyl liquid crystal, phenylcyclohexane liquid crystal, ester liquid crystal, terphenyl liquid crystal, biphenylcyclohexane liquid crystal, pyrimidine liquid crystal, dioxane liquid crystal, bicyclooctane liquid crystal, cubane liquid crystal and the like. They may contain a cholesteric liquid crystal such as cholesteryl chloride, cholesteryl nonanoate or cholesteryl carbonate, a chiral agent marketed under the trade name of C-15 or CB-15 (products of Merck & Co., Inc), and the like. A ferroelectric liquid crystal such as p-decyloxybenzylidene-p-amino-2-methylbutyl cinnamate can be also used.

Therefore, according to the present invention, thirdly, there is provided a liquid crystal display device comprising the liquid crystal alignment layer of the present invention.

As the polarizer used on the outer sides of the liquid crystal cell may be used a polarizer comprising cellulose acetate protective films sandwiching a polarizing film called "H film" which has absorbed iodine while a polyvinyl alcohol is drawn and oriented, or a polarizer composed of the H film itself.

The following examples are given to further illustrate the present invention. However, the present invention is not limited to these examples.

EXAMPLE 1

A soluble polyimide (logarithmic viscosity: 1.3 dl/g) comprising recurring units represented by the following formula and composed of tricarboxycyclopentylacetic dianhydride and 4,4'-diaminodiphenyl methane was used as an organic polymer.

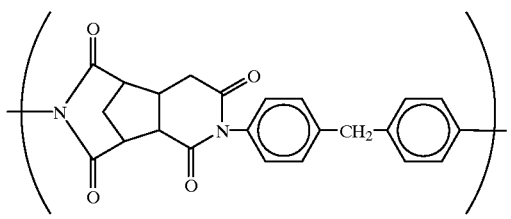

This polymer was dissolved in y-butyrolactone to prepare a solution having a solid content of 4 wt %. This solution was filtered with a filter having a pore diameter of 1 μm to prepare a solution of a liquid crystal aligning agent. The solution was coated on the transparent electrode surface of a glass substrate having the transparent electrode composed of an ITO film to a thickness of 0.1 μm by a spinner, and dried at 180° C. for 1 hour to form a thin film.

The surface of the thin film was exposed to 3 mJ/cm$^2$ of polarized Nd-YAG laser beam having a main wavelength of 266 nm from the Quanta-Ray GCR (manufactured by Spectra-Physics) at a pulse frequency of 10 Hz and an incident angle of 15° to form a liquid crystal alignment layer of the present invention.

Thereafter, an epoxy resin adhesive containing aluminum oxide particles having a diameter of 17 $\mu$m was coated, by a screen printing, on the outer edges, having a liquid crystal alignment layer, of a pair of substrates having the liquid crystal alignment layer of the present invention formed thereon, the pair of substrates were placed one upon the other in such a manner that the liquid crystal alignment layers of the substrates faced each other and the irradiation directions of the pulsed laser beam cross at right angles to each other, and bonded together by pressure, and the adhesive was cured.

Then, nematic liquid crystals (ZLI-1565 of Merck) were filled into the gap between the pair of substrates from a filling hole for liquid crystals, the filling hole was sealed up with an epoxy adhesive, and a polarizer was stuck to both outer sides of the substrates in such a manner that the polarizing direction of the polarizer agreed with the irradiation direction of pulsed laser beam onto the liquid crystal alignment layer of each of the substrates to produce a liquid crystal display device. The aligning properties of the liquid crystals were satisfactory. When a voltage of 5 V was applied, changes in the brightness of the liquid crystal display device in response to ON-OFF of the applied voltage were observed.

EXAMPLE 2

A liquid crystal display device was produced in the same manner as in Example 1 except that a thermosetting polyimide (logarithmic viscosity of a polyamic acid as a precursor: 1.9 dl/g) comprising recurring units represented by the following formula:

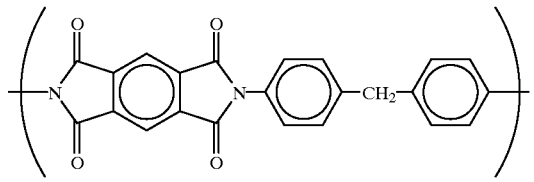

and composed of pyromellitic acid and 4,4'-diaminodiphenyl methane was used in place of the organic polymer used in Example 1, and the same results as in Example 1 was observed.

EXAMPLE 3

A liquid crystal display device was produced in the same manner as in Example 1 except that polystyrene was used in place of the organic polymer used in Example 1 and the same results as in Example 1 was observed.

REFERENCE EXAMPLE 1

A thin film was formed using the soluble polyimide used in Example 1 in the same manner as in Example 1. The obtained thin film was rubbed by a rubbing machine having a roll wound with a rayon cloth at a roll revolution of 500 rpm, a stage moving speed of 1 cm/sec and a pile compression length of 0.4 mm to form a liquid crystal alignment layer.

Thereafter, an epoxy resin adhesive containing aluminum oxide particles having a diameter of 17 $\mu$m was applied, by a screen printing, onto the outer edges having a liquid crystal alignment layer, of a pair of substrates having the liquid crystal alignment layer of the present invention formed thereon, the pair of substrates were placed one upon the other in such a manner that the liquid crystal alignment layers of the substrates faced each other and the irradiation directions of the pulsed laser beam cross at right angles to each other and bonded together by pressure, and the adhesive was cured.

Then, liquid crystals were filled and a polarizer was stuck to the substrates in the same manner as in Example 1 to produce a liquid crystal display device. The polarizer was stuck in such a manner that the polarizing direction agrees with the rubbing direction of the liquid crystal alignment layer of each of the substrates.

Comparison between Example 1 and Reference Example 1

Using the liquid crystal display device obtained in Example 1 and the liquid crystal display device obtained in Reference Example 1, the transmittance of a normally white TN liquid crystal cell was measured by changing the applied voltage from 1 V to 5 V to evaluate the transmittance-voltage characteristics of the cell in each of the liquid crystal display devices. The results are shown in FIG. 1. As is evident from FIG. 1, the liquid crystal display device of the present invention exhibited almost the same transmittance-voltage characteristics as those of a liquid crystal display device provided with aligning ability by rubbing.

According to the present invention, there can be obtained a liquid crystal alignment layer which effectively aligns molecules in a surface portion of the alignment layer non-destructively without producing dusts or a decomposed product and can provide aligning ability to liquid crystal molecules.

What is claimed is:

1. A method of producing a liquid crystal alignment layer comprising exposing an organic film of an organic polymer to polarized pulsed laser beam to align the organic polymer molecules in a surface portion of the organic film, wherein the organic film is exposed to the polarized pulsed laser beam with an irradiation energy of 1 mJ/cm$^2$ to 3 mJ/cm$^2$ per pulse.

2. The method of claim 1, wherein the organic film is formed from an organic polymer selected from the group consisting of polyimides, polysulfones, polyesters, polyamides, poly(meth)acrylates, polycarbonates, polyphenylene sulfides, polyphenylene oxides and norbornene resins.

3. The method of claim 2, wherein the organic polymer has a secondary transition point or melting point of at least about 90° and a solubility parameter of at least 8.5.

4. The method of claim 2, wherein the organic polymer is a polyimide containing recurring units represented by the following formula (I):

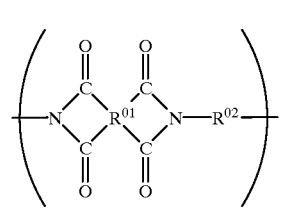

wherein $R^{01}$ is a tetravalent organic group and $R^{02}$ is a divalent organic group.

5. The method of claim 4, wherein the tetravalent organic group represented by $R^{01}$ in the above formula (I) is a residual group obtained by removing four carboxyl groups from a tetracarboxylic acid and the divalent organic group represented by $R^{02}$ is a residual group obtained by removing two amino groups from an organic diamine.

6. The method of claim 1, wherein the polarized pulsed laser beam has a wavelength of 193 nm to 532 nm.

7. The method of claim 1, wherein the polarized pulsed laser beam is irradiated onto the organic film at an incident angle of 10° to 40°.

8. A liquid crystal alignment layer composed of a polyimide film having molecules aligned by exposure to polarized pulsed laser beam, in a surface portion.

9. The liquid crystal alignment layer of claim 8, wherein a polyimide constituting the polyimide film contains recurring units represented by the following formula (I):

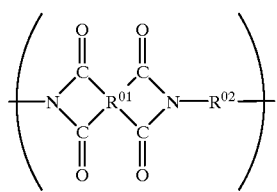

(I)

wherein $R^{01}$ is a tetravalent organic group and $R^{02}$ is a divalent organic group.

10. The liquid crystal alignment layer of claim 8, wherein the tetravalent organic group represented by $R^{01}$ in the above formula (I) is a residual group obtained by removing four carboxyl groups from a tetracarboxylic acid and the divalent organic group represented by $R^{02}$ is a residual group obtained by removing two amino groups from an organic diamine.

11. The liquid crystal alignment layer of claim 8, wherein a polyimide constituting the polyimide film is obtained by dehydrating and ring-closing a polyamic acid obtained from a tetracarboxylic dianhydride and a diamine compound.

12. The liquid crystal alignment layer of claim 8, wherein parallel swells having a pitch interval almost equal to a pitch interval represented by the following equation (VIII) are formed on the surface of the polyimide film:

$$P = \frac{\lambda}{n - \sin\theta} \tag{VIII}$$

wherein $\lambda$ is a wavelength (nm) of the polarized pulsed laser beam, n is a refractive index of the organic polymer, $\theta$ is an incident angle (°) of the polarized pulsed laser beam, and P is a pitch (nm) of a photoelastic wave produced on the surface of the organic film.

13. A liquid crystal display device comprising the liquid crystal alignment layer of claim 8.

* * * * *